US006631066B1

(12) United States Patent
Smith et al.

(10) Patent No.: US 6,631,066 B1
(45) Date of Patent: Oct. 7, 2003

(54) APPARATUS AND METHOD FOR INITIATING CROWBAR PROTECTION IN A SHUNT REGULATOR

(75) Inventors: Gregory J. Smith, Tucson, AZ (US); John Wendell Oglesbee, Watkinsville, GA (US)

(73) Assignee: National Semiconductor Corporation, Santa Clara, CA (US)

(*) Notice: Subject to any disclaimer, the term of this patent is extended or adjusted under 35 U.S.C. 154(b) by 8 days.

(21) Appl. No.: 09/848,748

(22) Filed: May 3, 2001

Related U.S. Application Data

(60) Provisional application No. 60/282,314, filed on Apr. 6, 2001, provisional application No. 60/203,795, filed on May 12, 2000, and provisional application No. 60/202,150, filed on May 5, 2000.

(51) Int. Cl.[7] .................................................. H02H 5/04
(52) U.S. Cl. ...................................................... 361/103
(58) Field of Search .......................... 361/99, 158, 103, 361/54, 56, 57, 18; 374/178, 183; 320/149, 158, 163

(56) References Cited

U.S. PATENT DOCUMENTS

| | | | | | |
|---|---|---|---|---|---|
| 4,001,649 | A | * | 1/1977 | Young | 317/41 |
| 4,017,789 | A | * | 4/1977 | Morris | 323/17 |
| 4,052,744 | A | * | 10/1977 | Boothman et al. | 361/103 |
| 4,209,736 | A | * | 6/1980 | Reidenbach | 320/22 |
| 4,330,809 | A | * | 5/1982 | Stanley | 361/103 |
| 5,119,265 | A | * | 6/1992 | Qualich et al. | 361/103 |
| 5,296,797 | A | * | 3/1994 | Bartlett | 320/21 |
| 5,451,857 | A | * | 9/1995 | Moe | 320/35 |
| 5,488,324 | A | * | 1/1996 | Mizuta et al. | 327/77 |
| 5,869,969 | A | * | 2/1999 | Cividino et al. | 324/431 |
| 5,883,504 | A | * | 3/1999 | Okada | 323/276 |
| 6,300,750 | B1 | * | 10/2001 | Oglesbee et al. | 323/266 |
| 6,331,763 | B1 | * | 12/2001 | Thomas et al. | 320/136 |

* cited by examiner

*Primary Examiner*—Gregory J. Toatley, Jr.
*Assistant Examiner*—Zeev Kitov
(74) *Attorney, Agent, or Firm*—Brett A. Hertzberg; Merchant & Gould

(57) ABSTRACT

A method and apparatus provide for improved crowbar protection in a shunt regulator circuit including a shunt device. An over-temperature protection circuit may be combined with a fast-crowbar protection circuit such that maximum protection from damaging thermal energy is provided to a shunt device. The fast-crowbar protection circuit estimates the thermal energy in the shunt device based upon an integration method. By integrating a measured power over time the rise in temperature can be estimated such that the crowbar protection is enabled before the thermal energy can damage the shunt device. The integration method can be approximated using a piece-wise linear approximation such that the estimation circuitry can be simplified. A series of comparators and timing/delay circuits are employed to measure a current level in the shunt device over a given duration. The timing/delay circuits have memory such that heat build up and heat dissipation are modeled.

32 Claims, 10 Drawing Sheets

APPARATUS AND METHOD FOR INITIATING CROWBAR PROTECTION IN A SHUNT REGULATOR

CROSS-REFERENCE TO RELATED APPLICATIONS

This application claims the benefit under 35 U.S.C. §119 (e) of U.S. Provisional Application No. 60/282,314, filed on Apr. 6, 2001; U.S. Provisional Application No. 60/202,150 filed on May 5, 2000; and U.S Provisional Application No. 60/203,795, filed on May 12, 2000.

FIELD OF THE INVENTION

The present invention relates to a method and apparatus that initiates a crowbar protection mode in a shunt regulator in response to variable time and current criteria. More specifically, the present invention uses a piecewise linear approximation method to dynamically activate a crowbar mode by monitoring time and intensity of current conduction in the shunt regulator.

BACKGROUND OF THE INVENTION

Overcharging is an issue that must be addressed in a battery protection circuits. Lithium based batteries, including Lithium-Ion batteries and Lithium-Polymer batteries tend to be sensitive to excessive voltages. Without a suitable safety circuit overcharging may compromise the batteries reliability.

For improved reliability, chargers and battery packs include devices that bypass the battery charging current when charging becomes excessive. Such devices detect excessive charging current and reroute the charging current through a shunt circuit. One such device is a "Zener-fuse" circuit as shown in FIG. 1.

The "Zener-fuse" circuit shown in FIG. 1 includes a power supply/charger (102), a fuse (108), a zener diode (106), and a battery cell (104). The power supply/charger (102) includes a power terminal (PWR) that is connected to node N10, and a ground terminal (GND) that is connected to node N12. The fuse (108) is series connected between node N10 and node N11. The zener diode (106) has a cathode that is connected to node N11 and an anode that is connected to node N12. A battery cell (104) has a positive terminal connected to node N11 and a negative terminal connected to node N12. Node N12 is a circuit ground potential.

The power supply charger (102) is arranged to provide a charging current to the battery cell (104) through the fuse (108). The zener diode (106) is connected in parallel with the battery cell. In this circuit, the zener diode (106) begins conducting in the reverse-biased, or "avalanche", mode when the voltage from the power supply/charger (102) exceeds the normal charging voltage of the battery cell (104). Once the zener diode (106) is in the avalanche mode, the zener diode acts as a short circuit relative to the power supply/charger (102). The avalanche condition of the zener causes the current to increase rapidly which causes the fuse (108) to clear, isolating the battery cell (104) from the power supply/charger (102).

The circuit shown in FIG. 1 does not produce a perfect short circuit condition when the zener diode (106) conducts in the avalanche mode. Instead, a voltage develops across the zener diode (106) causing it to dissipate power. As the zener diode (106) begins conducting higher currents, the zener diode (106) rapidly generates heat, creating a thermal race condition between the fuse (108) and the zener diode (106). In order to safely clear the fuse (108), the zener diode (106) must experience thermal degradation at a slower rate than the fuse (108). In order to ensure that the fuse (108) clears before the zener diode (106) reaches a catastrophic temperature (a temperature that causes the zener diode to fail), a zener diode (106) with a high power rating must be employed. High power zener diodes are often big, bulky, and expensive.

SUMMARY OF THE INVENTION

In accordance with the present invention, an apparatus and method provides for enhanced crowbar protection in a shunt regulator. The crowbar protection is dynamically tuned to maximize safe power performance in the shunt regulator without interruption from over-current protection. In one example of the present invention, an improved crowbar protection circuit has a continuously variable threshold that maximizes the safe operating range of the shunt regulator. In another example of the present invention, an improved crowbar protection circuit has a piece-wise approximation of a thermal crowbar protection profile such that multiple threshold points are used to selectively activate crowbar protection based on a given current conduction level and an associated transient time for the given current conduction level.

Briefly stated, the present invention relates to a method and apparatus provide for improved crowbar protection in a shunt regulator circuit. The shunt regulator includes a shunt device that generates thermal energy during conduction. An over-temperature protection circuit may be combined with a fast-crowbar protection circuit such that maximum protection from damaging thermal energy is provided to the shunt device. Thermal energy develops in the shunt device at a rate that is faster than an associated time for heat to physically transfer to a thermal sensor. The fast-crowbar protection circuit estimates the thermal energy in the shunt device based upon an integration method. By integrating a measured power over time the rise in temperature can be estimated such that the crowbar protection is enabled before the thermal energy can damage the shunt device. The integration method can be approximated using a piece-wise linear approximation such that the estimation circuitry can be simplified. A series of comparators and timing/delay circuits are employed to measure a current level in the shunt device over a given duration. The timing/delay circuits have memory such that heat build up and heat dissipation are modeled. In one example, a capacitor circuit is used to generate a time constant for the timing/delay circuit. The capacitor circuits associated charging and discharging times are different such that thermal memory is modeled.

According to a feature of the invention, an apparatus is directed to estimating a temperature in a shunt circuit that includes a transistor having an associated shunt current, an associated ambient temperature, and an associated heat dissipation factor. The apparatus includes a measurement circuit that is arranged to produce a measurement signal that is associated with the shunt current. A temperature measurement circuit may optionally be arranged to produce a temperature measurement signal that corresponds to the ambient temperature. An integration circuit is arranged to produce an integration signal in response to the measurement signal such that the integration signal corresponds to an integral of the measurement signal over a time interval. The integration signal corresponds to the rise in temperature in the shunt circuit such that the temperature of the shunt circuit is estimated using the integration signal. When the optional temperature measurement circuit is used, the temperature measurement signal may be used in conjunction with the integration signal to estimate the temperature in the shunt circuit.

According to another feature of the invention, an apparatus is directed to producing a detection signal that indicates that an estimated temperature has exceeded a safety temperature in a circuit that includes a transistor circuit with an associated operating current. The apparatus includes a means for measuring current that is arranged to measure the operating current of the transistor and produce a measured operating current. Optionally, a means for measuring temperature is arranged to measure the ambient temperature at an initial time and produce a measured ambient temperature that is associated with the transistor. A means for integrating is arranged to integrate the measured operating current over a time interval to produce an integration signal. A means for estimating is arranged to provide the estimated temperature in response to the integration signal. The integration signal corresponds to a rise in the ambient temperature of the transistor circuit. A means for comparing is arranged to compare the estimated temperature to the safety temperature and produce a fast detection signal. The fast detection signal indicates that the estimated temperature has exceeded the safety temperature. The detection signal is responsive to the fast detection signal.

According to yet another feature of the invention, an apparatus is directed to estimating a temperature in a shunt circuit that includes a transistor having an associated shunt current, an associated ambient temperature, and an associated heat dissipation factor. The apparatus includes a measurement circuit that is arranged to produce a measurement signal that is associated with the shunt current. A bank of N comparator circuits is also included. Each of the comparator circuits produces a corresponding detection signal in response to a comparison between the measurement signal and a corresponding reference signal. Each detection signal indicates that the shunt current has exceeded a corresponding current threshold level that is determined by the corresponding reference signal. A bank of N timing/delay circuits is also included. Each of the bank of N timing/delay circuits produces a corresponding timeout signal when a corresponding one of the detection signals has persisted for a corresponding delay time interval. A combination circuit combines the N timeout signals to produce a fast detection signal. The fast detection signal indicates that the shunt current has exceeded at least one of the current threshold levels for the corresponding delay time interval.

According to still another feature of the invention, a method is directed to estimating a temperature in a shunt device that has an ambient temperature and an operating current level. The method includes sensing the operating current level of the shunt device to produce a sense signal, integrating the sense signal over a time interval from the initial time to a subsequent time to produce an estimated temperature rise signal, and estimating the temperature in the shunt device in response to the estimated temperature rise signal. Also, by comparing the estimated temperature rise signal to a reference signal that is related to the ambient temperature, a fast detection signal is produced that indicates the estimated temperature rise signal has exceeded a safety margin for the shunt device.

According to a further feature of the invention, the integration of the sense signal may be approximated using a piece-wise linear approximation. The piece-wise linear approximation is implemented by comparing the sense signal to a first reference signal and producing a first detection signal that corresponds to a first operating current level of the shunt device, and, comparing the sense signal to a second reference signal to produce a second detection signal that corresponds to a second operating current level that is different from the first operating current level. A first capacitive circuit is charged at a first charge rate in response to the first detection signal when the sense signal indicates that the operating current level is substantially greater than the first operating current level. The first capacitive circuit has a first potential associated therewith. A second capacitive circuit is charged at a second charge rate in response to the second detection signal when the sense signal indicates that the operating current level has exceeded the second operating current level. The second capacitive circuit has a second potential associated therewith. The first capacitive circuit is discharged at a first discharge rate in response to the first detection signal when the sense signal indicates that the operating current level is substantially less than the first operating current level. The second capacitive circuit is discharged at a second discharge rate in response to the second detection signal when the sense signal indicates that the operating current level is substantially less than the second operating current level. Detecting that the first potential has exceeded a first reference signal produces a first detection signal. Detecting that the second potential has exceeded a second reference signal produces a second detection signal. The method determines that the estimated temperature rise signal has exceeded a safety margin when indicated by at least one of the first detection signal and the second detection signal.

A more complete appreciation of the present invention and its improvements can be obtained by reference to the accompanying drawings, which are embodiments of the invention briefly summarized below, to the following detail description of presently preferred, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". Also, "battery" includes single cell batteries and multiple cell batteries.

Figure 1:
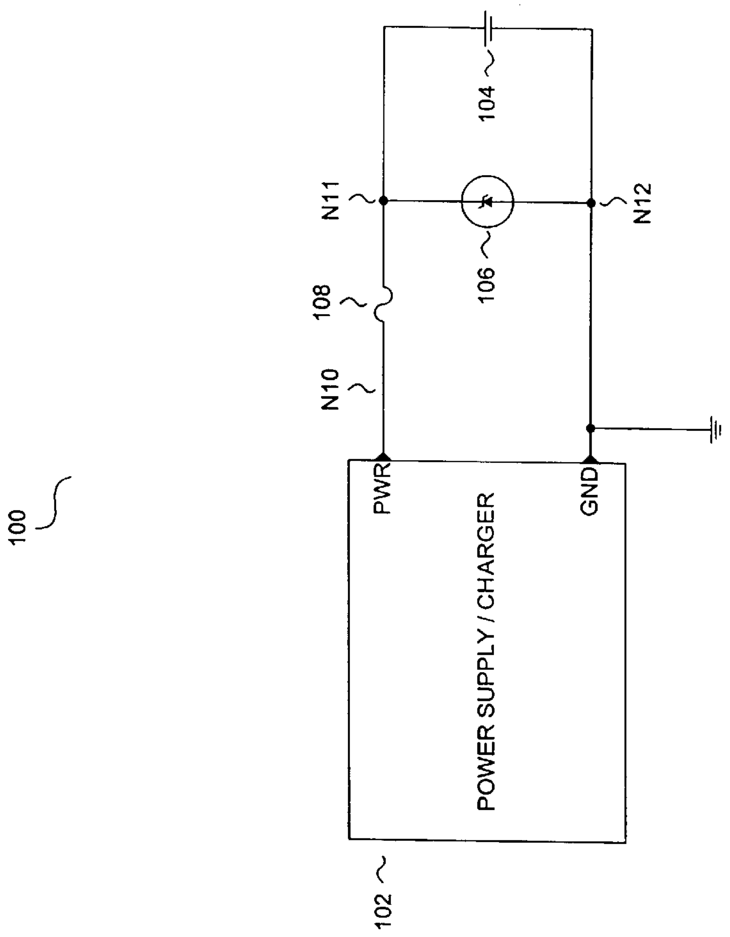
(Prior Art) FIGURE 1
FIG. 1 is a schematic diagram of a conventional zener fuse protection circuit.
Figure 2:
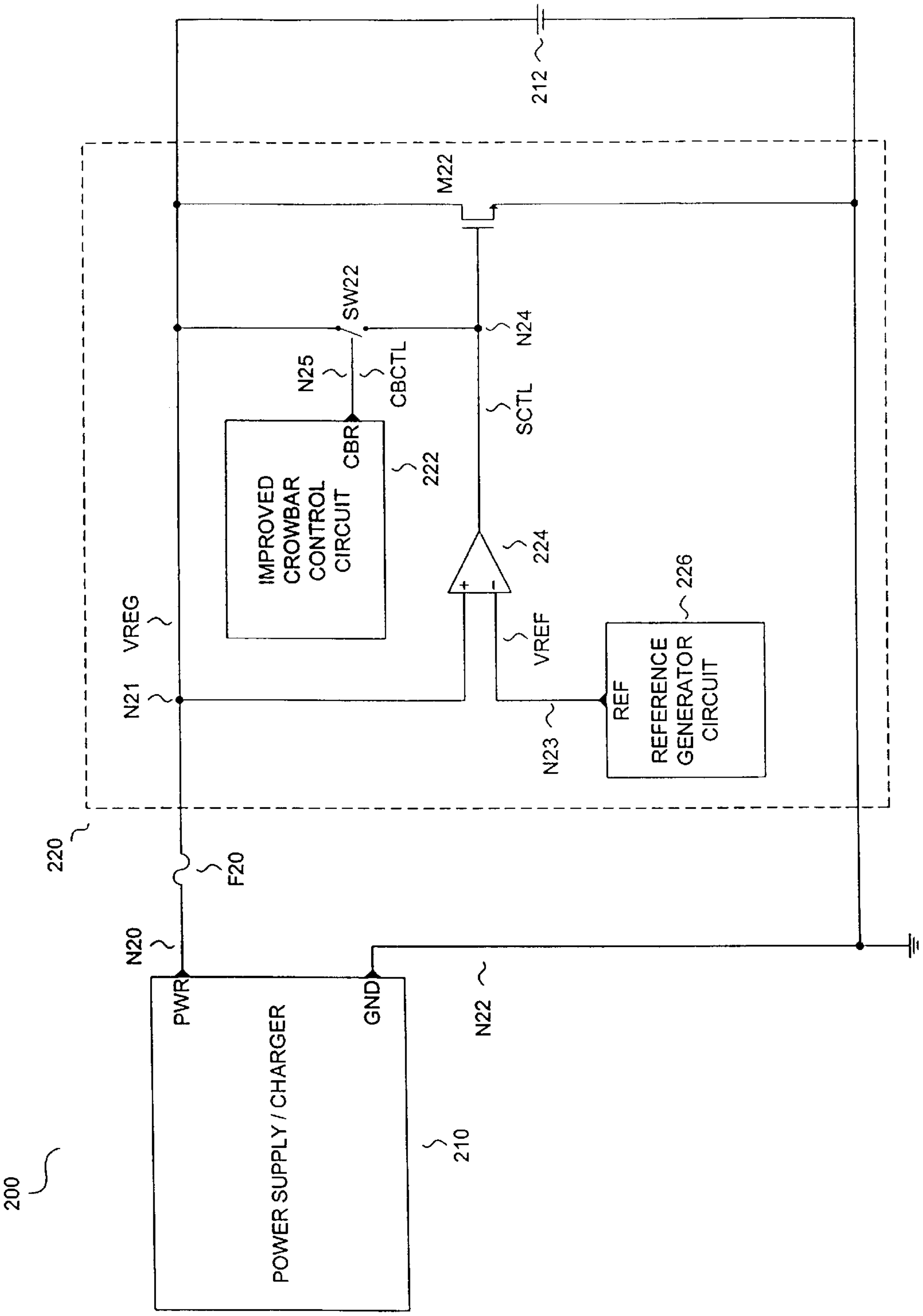
FIG. 2 is a schematic diagram of an exemplary operating environment.

FIG. 2 is a schematic diagram illustrating an operating environment (200) for a shunt regulator system that includes the present invention. As shown in the figure, the shunt regulator system includes a power supply charger (210), a fuse (F20), a battery cell (212), and a shunt regulator circuit (220). The shunt regulator circuit (220) includes an improved crowbar control circuit (222), an error amplifier (224), a reference generator circuit (226), a controlled switch (SW22), and a MOS transistor (M22).

The power supply/charger (210) has a power terminal (PWR) that is coupled to node N20, and a ground terminal (GND) that is coupled to node N22. The fuse (F20) is coupled in series between node N20 and node N21. The battery cell (212) is coupled between node N21 and node N22. The improved crowbar control circuit (222) includes an output port (CBR) that is coupled to node N25. The error amplifier (224) has a non-inverting input port that is coupled to node N21, an inverting input port that is coupled to node N23, and an output port that is coupled to node N24. The reference generator circuit (226) includes an output port (REF) that is coupled to node N23. The switch (SW22) has a control port that is coupled to node N25, a bi-directional port that is coupled to node N21, and another bi-directional port that is coupled to node N24. The MOS transistor (M22) has a drain that is coupled to node N21, a gate that is coupled to node N24, and a source that is coupled to node N22.

In operation, the power supply/charger (210) provides power to node N20 that is effective to produce a charging current for the battery cell (212) through the fuse (F20). Node N22 operates as a circuit ground potential. The shunt regulator circuit (220) regulates the power at node N21 such that the battery cell (212) is charged with a regulated voltage (VREG). The reference generator circuit (226) provides a reference voltage (VREF) at node N23. The error amplifier compares the regulation voltage (VREG) to the reference voltage (VREF) and produces a shunt control signal (SCTL) at node N24 in response to the comparison. The shunt control signal (SCTL) controls the gate voltage of the MOS transistor (M220) such that the MOS transistor (M22) is selectively activated and deactivated to regulate the regulation voltage (VREG). The improved crowbar control circuit provides a crowbar control signal (CBCTL) at node N25 in response to various criteria as will be described later. The switch (SW22) is arranged such that the gate of transistor (M22) is coupled to the regulation voltage (VREG) when activated. Thus, the activation of the switch (SW22) causes transistor M22 to activate such that transistor M22 will shunt all of the current from the power supply charger to the circuit ground, causing the fuse (F20) to clear.

In normal operation, the error amplifier provides a shunt control signal (SCTL) that controls the gate voltage of MOS transistor (M22) to ensure proper regulation. The MOS transistor (M22) operates as a shunt device, shunting transient currents to ground. In order to protect the shunt regulator circuit (220) from excessively high temperatures, the MOS transistor (M22) is driven into crowbar mode to reduce the shunt voltage and protect the shunt regulator circuit (220) from being damaged. In particular, the MOS transistor (M22) needs to be protected from thermal stress using the crowbar protection methodology. The improved crowbar control circuit (220 and the switch (SW20) together provide an improved crowbar protection circuit.

The improved crowbar control circuit (220) includes a temperature sensor (not shown) that is arranged to detect the junction temperature of the MOS transistor (M22). The temperature sensor is located in close proximity to the MOS transistor (M22). For normal transient currents, the junction temperature of the transistor (M22) increases gradually and the temperature sensor is effective to activate the crowbar mode before the MOS transistor (M22) can become damaged. However, the temperature sensor will not react quickly when a fast current transient occurs in the MOS transistor (M22). When a fast transient high-stress current occurs in the shunt regulator circuit (220), the junction temperature of the MOS transistor (M22) increases so rapidly that a high thermal-stress condition can damage the MOS transistor (M22) before the heat can spread to the adjacently located temperature sensor.

The improved crowbar control circuit (222) also includes a means for predicting the junction temperature of the transistor (M22) during a fast transient high-stress current event. By estimating the junction temperature of the transistor (M22), the transistor can be protected from damage by activating the crowbar mode before the thermal stress can damage the transistor (M22).

A common source of the high stress over-current event is the switching of a large value charged capacitor to the shunt regulator's input between node N21 and node N22. The charged capacitor instantaneously discharges a high current in a very short time interval (a short duration event). The improved crowbar protection circuit (222, SW20) also includes a delay in crowbar activation such that a short duration event does not trigger the crowbar mode unless the thermal stress has exceeded some threshold.

Figure 3:
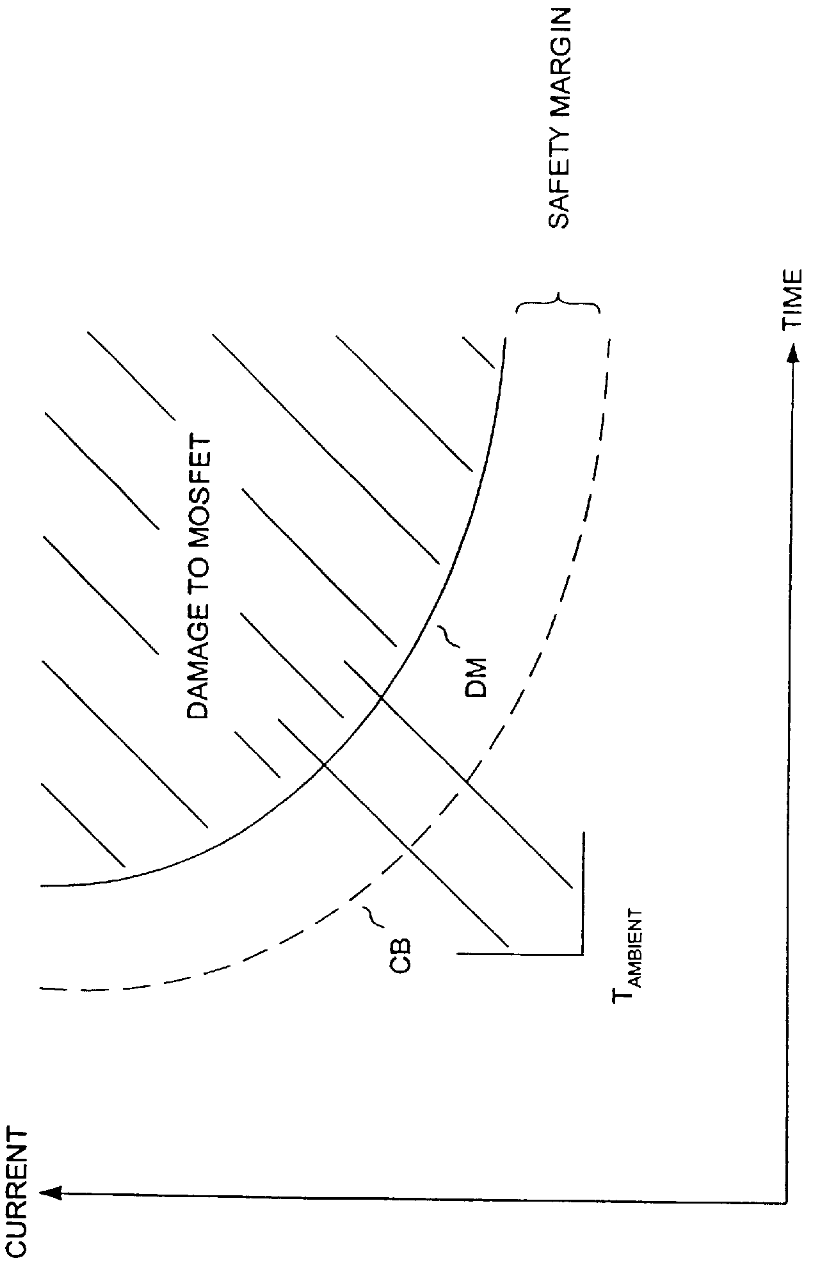
FIG. 3 is a graph of waveforms related to a thermal crowbar protection profile.

As mentioned previously, the improved crowbar protection circuit includes a delay such that activation of the switch (SW20) is dependent on the length of time that the stressing even occurs. Assuming we did not have the crowbar protection circuit (222, SW20), the shunt regulator circuit (220) would continue to regulate the voltage at node N21 until the transistor (M22) became destroyed or damaged. FIG. 3 is a graph illustrating the thermal characteristics of the MOS transistor (M22) under a stress current for various time intervals. In the figure, the regulated voltage (VREG) is maintained as the shunt voltage that would damage the transistor (M22).

The graph in FIG. 3 includes two transition curves (CB, DM). The dotted transition curve (CB) indicates the boundary from normal shunt operation to the crowbar mode. The solid transition curve (DM) indicates the boundary where damage occurs in the MOSFET. As can be seen in the graph, a higher current results in a damaged MOSFET in a shorter time interval than a lower current. As the ambient temperature increases, the entire curve shifts down such that the required time interval is shortened for the same current. The dotted curve (CB) is included in the graph to illustrate a desired transition boundary where the crowbar mode should be activated to prevent the MOS transistor (M22) from damage. The gap between the dotted curve (CB) and the solid curve (DM) indicates the safety margin that is desired to prevent damage to the MOSFET.

The transient temperatures in the shunt regulator circuit (220) can be mathematically analyzed by their physical relationships. The rise in temperature ($T_R$) of the MOS transistor (M22) can be determined by:

$$T_R=E/m, \text{ where E is energy and m is thermal mass (a constant).} \quad (1)$$

Energy (E) is given as:

$$E=\int p\cdot dt, \text{ where p is power.} \quad (2)$$

Combining equation (1) and equation (2) yields:

$$T_R=\int p/m\ dt=(1/m)\int p\cdot dt \quad (3)$$

Power (p) is given as:

$$p=i\cdot v, \text{ where i is current and v is voltage} \quad (4)$$

Combining equation (3) and (4) yields:

$$T_R=(1/m)\int i\cdot v\cdot dt \quad (5)$$

Since the shunt regulator circuit maintains a relatively constant voltage across the transistor (M22) during operation, the voltage (v) is also a constant. Thus, the rise in temperature given by equation (5) can be simplified as:

$$T_R=(v/m)\int i(t)\cdot dt \quad (6)$$

Applying the above thermal characteristics, the improved crowbar control circuit (222) can estimate the rise in junction temperature for the MOS transistor (M22) using an integrator circuit arrangement. An example shunt regulator circuit using the integrator methodology will be discussed below.

Figure 4:
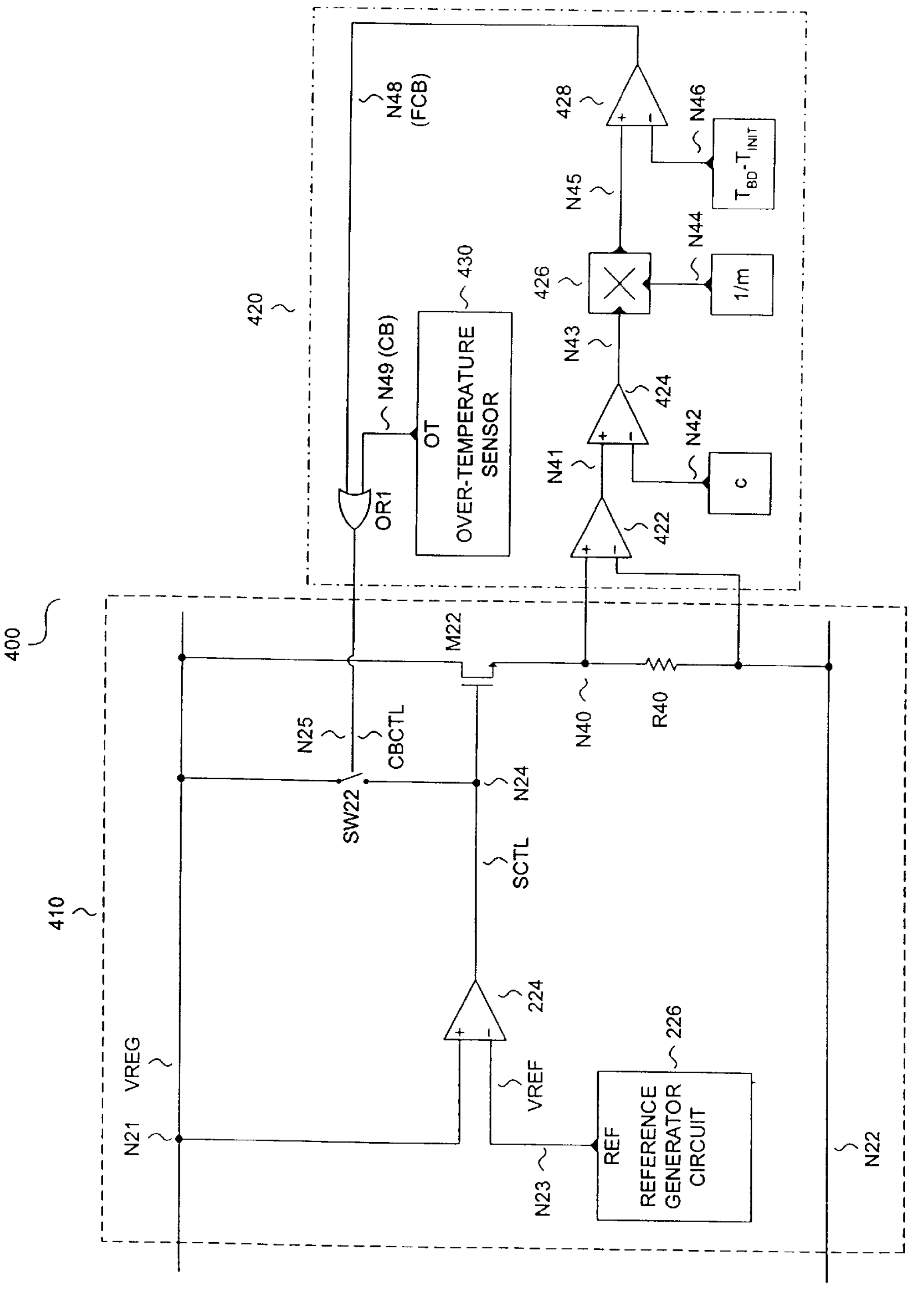
FIG. 4 is a schematic diagram of an exemplary embodiment.

A shunt regulator system (400) that is in accordance with the present invention is shown in FIG. 4. The shunt regulator system (400) includes a shunt regulator circuit (410) and an improved crowbar protection circuit (420). The shunt regulator circuit (410) includes an error amplifier (224), a reference generator circuit (226), a controlled switch (SW22), a MOS transistor (M22), and a sense resistor (R40). The improved crowbar protection circuit (420) includes a voltage sense amplifier (422), an integrator (424), a multiplier (426), a comparator (428), an over temperature sensor (430) and an OR logic gate (OR1).

The shunt regulator circuit (410) is configured similar to the shunt regulator circuit (220) shown in FIG. 2, with the addition of the sense resistor (R40). The error amplifier (224) has a non-inverting input port that is coupled to node N21, an inverting input port that is coupled to node N23, and an output port that is coupled to node N24. The reference generator circuit (226) includes an output port (REF) that is coupled to node N23. The switch (SW22) has a control port that is coupled to node N25, a bi-directional port coupled to node N21, and another bi-directional port coupled to node N24. The MOS transistor (M22) has a drain coupled to node N21, a gate coupled to node N24, and a source coupled to node N40. The sense resistor (R40) is coupled between node N40 and node N22.

The shunt regulator circuit (410) shown in FIG. 4 operates substantially the same as the shunt regulator circuit (220) shown in FIG. 2. The addition of the sense resistor (R40) between the source and the drain of the MOS transistor (M22) does not substantially impact the shunt regulator during regulation. The shunt regulator circuit (410) may be arranged to cooperate with a power supply/charger (210) and fuse (F20) as shown in FIG. 2.

The improved crowbar protection circuit (420) shown in FIG. 4 illustrates an exemplary continuous time integration crowbar protection system that is in accordance with the present invention. The voltage sense amplifier (422) has a non-inverting input coupled to node N40, an inverting input coupled to node N22, and an output coupled to node N41. The integrator (424) has a non-inverting input coupled to node N41, an inverting input coupled to node N42, and an output coupled to node N43. The multiplier (426) has an input coupled to node N43, another input coupled to node N44, and an output coupled to node N45. The comparator (428) has a non-inverting input coupled to node N45, an inverting input coupled to node N46, and an output coupled to node N48. The over-temperature sensor (430) has an output (OT) coupled to node N49. The OR logic gate (OR1) has an input coupled to node N48, another input coupled to node N49, and an output coupled to node N25.

The voltage sense amplifier (422) is arranged to sense the voltage drop across the sense resistor (R40), and produce a signal at node N41 that corresponds to the current level in the MOS transistor (M22). The integrator (424) receives the signal at node N41, another signal at node N42, and produces an integrated signal at node N43. The MOS transistor (M22) will dissipate heat at a rate that is given by a thermal cooling constant (c). The signal at node N42 corresponds to the thermal cooling constant (c) for the MOS transistor (M22). The integrator (424) is arranged to subtract the thermal cooling constant (c) from the signal at node N41 to compensate for the heat dissipation in the MOS transistor (M22). The multiplier (426) produces a signal at node N45 that corresponds to the signal at node N43 (the output of the integrator) multiplied by the signal at node N44. The signal at node N44 corresponds to the thermal mass of the MOS transistor (M22). Referring to the equation (6) discussed previously, the signal at node N44 corresponds to (1/m), where m is the thermal mass of the MOS transistor (M22). The signal at node N45 corresponds to the estimated junction temperature rise ($T_R$ in equation (6)) in the MOS transistor (M22). The comparator (428) compares the signal at node N45 (the estimated junction temperature rise) to the signal at node N46. The signal at node N46 corresponds to a difference between the junction breakdown temperature ($T_{BD}$) and the initial temperature ($T_{INIT}$) during a given integration time period. When the rise in the junction temperature ($T_R$) approaches the difference signal at node N46 ($T_{BD}-T_{INIT}$), the comparator asserts a fast crowbar signal (FCB) at node N48. The over-temperature sensor (430) produces a crowbar signal (CB) at node N49 (an over-temperature signal) when the over-temperature sensor detects that the junction temperature has approached a predetermined threshold temperature such as the breakdown temperature for the MOS transistor (M22). The OR logic gate (OR1) combines the crowbar signal (CB) and the fast crowbar signal (FCB) such that either signal will activate the crowbar mode by asserting the crowbar control signal (CBCTL) at node N25. The fast-crowbar signal (FCB) is a fast detection signal that indicates that the junction temperature is rising at a rate that will exceed the junction temperature before the over-temperature sensor can detect a change in the junction temperature. The crowbar control signal (CBCTL) indicates that either the over-temperature signal (crowbar signal, CB) or the fast detection signal (fast crowbar signal, FCB) has tripped. Thus, the system shown in FIG. 4 provides two modes of operation, a fast crowbar mode and a thermal crowbar mode. The fast crowbar mode is activated when a fast transient occurs and it is estimated that the junction temperature will exceed the breakdown temperature of the MOS transistor (422). The thermal crowbar mode is activated when an actual temperature is detected that is approaching the breakdown temperature of the MOS transistor (M22).

In one example, the junction breakdown temperature of the MOS transistor is 150° C. For this example, the thermal crowbar protection mode is activated when the over-temperature sensor (430) indicates that the temperature has approached 150° C. However, the thermal crowbar protection mode will not be activated when a fast transient occurs and there is insufficient time for the heat to transfer from the MOS transistor (M22) to the over-temperature sensor (430). In this case, the fast crowbar mode must be activated. If the initial junction temperature ($T_{INIT}$) of the MOS transistor (M22) is 75° C., then the fast crowbar mode is activated after a 75° C. rise in the junction temperature ($T_{BD}-T_{INIT}=75°$ C.). In another example, the initial junction temperature ($T_{INIT}$) is 25° C., and the fast crowbar mode is activated after a 125° C. rise in the junction temperature ($T_{BD}-T_{INIT}=125°$ C.). Additional safety margins may be supplied such that the fast crowbar mode and the thermal crowbar mode are activated before the junction breakdown temperature is approached (i.e., 140° C. instead of 150° C.).

Figure 5:
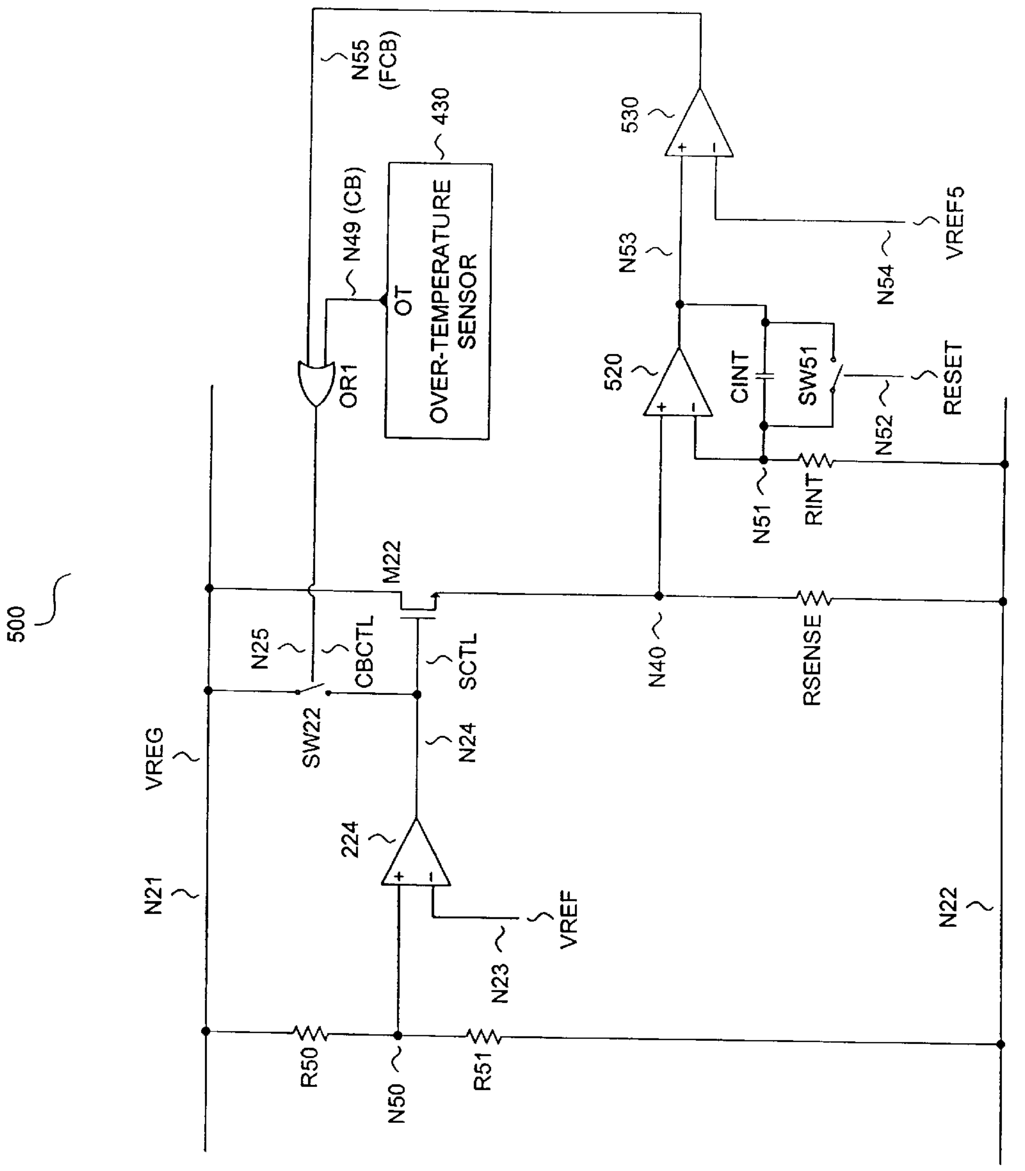
FIG. 5 is a schematic diagram of another exemplary embodiment.

FIG. 5 is a schematic diagram of an exemplary embodiment of the present invention. Like components from FIGS. 2, 3 and 5 are labeled identically. The figure illustrates a shunt regulator circuit (500) that includes an improved crowbar protection circuit. The circuit includes four resistors (R50, R51, RSENSE, RINT), a capacitor (CINT), an error amplifier (224), a controlled switch (SW22), a MOS transistor (M22), an amplifier (520), another controlled switch (SW51), a comparator (530), an OR logic gate (OR1), and an over-temperature sensor (430).

The error amplifier (224) has a non-inverting input port that is coupled to node N50, an inverting input port that is coupled to node N23, and an output port that is coupled to node N24. The controlled switch (SW22) has a control port that is coupled to node N25, a bi-directional port that is coupled to node N21, and another bi-directional port that is coupled to node N24. The MOS transistor (M22) has a drain that is coupled to node N21, a gate that is coupled to node N24, and a source that is coupled to node N40. The sense resistor (R40) is coupled between node N40 and node N22. One resistor (R50) is connected between node N21 and node N50. Another resistor (R51) is connected between node N50 and node N22.

The amplifier (520) has a non-inverting input that is coupled to node N40, an inverting input that is coupled to node N51, and an output that is coupled to node N53. An integration capacitor (CINT) is coupled between node N51 and node N53. An integration resistor (RINT) is coupled between node N51 and node N22. The other controlled switch (SW50) has a control port that is coupled to node N52, a bi-direction port that is coupled to node N51, and another bi-directional port that is coupled to node N53. The comparator (530) has a non-inverting input that is coupled to node N53, an inverting input that is coupled to node N54, and an output that is coupled to node N55. The over-temperature sensor (430) has an output port (OT) that is coupled to node N49. The OR logic gate (OR1) has a first input that is coupled to node N49, a second input that is coupled to node N55, and an output that is coupled to node N25.

In operation, a first reference voltage (VREF) is applied to node N23. The error amplifier (224) compares the first reference voltage (VREF) to the voltage at node N50, which serves as a feedback signal that is produced by a voltage divider from the regulation voltage (VREG) at node N21. Although a resistive voltage divider is shown in FIG. 5 (resistors R50 and R51), any other components may be used to form a feedback network. The error amplifier (224) provides a shunt control signal (SCTL) at node N24 in response to its input signals. The shunt control signal controls the activation and deactivation of the MOS transistor (M22), which operates as a shunt device.

The improved crowbar protection circuit shown in FIG. 5 senses the current in the MOS transistor (M22), which is the shunt current in the shunt regulator. In this implementation, a potential drop across the sense resistor (RSENSE) is measured to determine the shunt current. However, other methods of sensing the shunt current may also be employed. The shunt current is sensed at node N40 and integrated by the amplifier (520) and the integration capacitor (CINT). Periodically, the integration capacitor can be discharged by the other controlled switch (SW51), which shorts node N51 to node N53 when activated by a reset signal (RESET). The charging time for the integration is determined by an RC time constant that is determined by the values of the integration capacitor (CINT) and the integration resistor (RINT). Another reference potential (VREF5) is applied to node N54. The amplifier (520) produces an integration signal at node N53 in response to the signal sensed at node N40. The comparator (530) asserts a fast crowbar signal (FCB) at node N55 when the integration signal exceeds the other reference signal (VREF5). The over-temperature sensor (430) produces asserts a thermal crowbar signal (CB) when the over-temperature sensor (430) senses that the junction temperature of the MOS transistor (M22) has exceeded some predetermined threshold temperature. The fast crowbar signal and the thermal crowbar signal are combined by the OR logic gate (OR1) to produce a crowbar control signal (CBCTL) which actuates the crowbar switch (SW22).

As shown in FIG. 3, a crowbar protection mode can be activated when the junction temperature is estimated to exceed some predetermined level that is measured by the shunt current over a specified time interval. A piece-wise approximation of the junction temperature approach can be used to reduce the complexity of the circuitry required to implement the estimation of the junction temperature.

Figure 6:
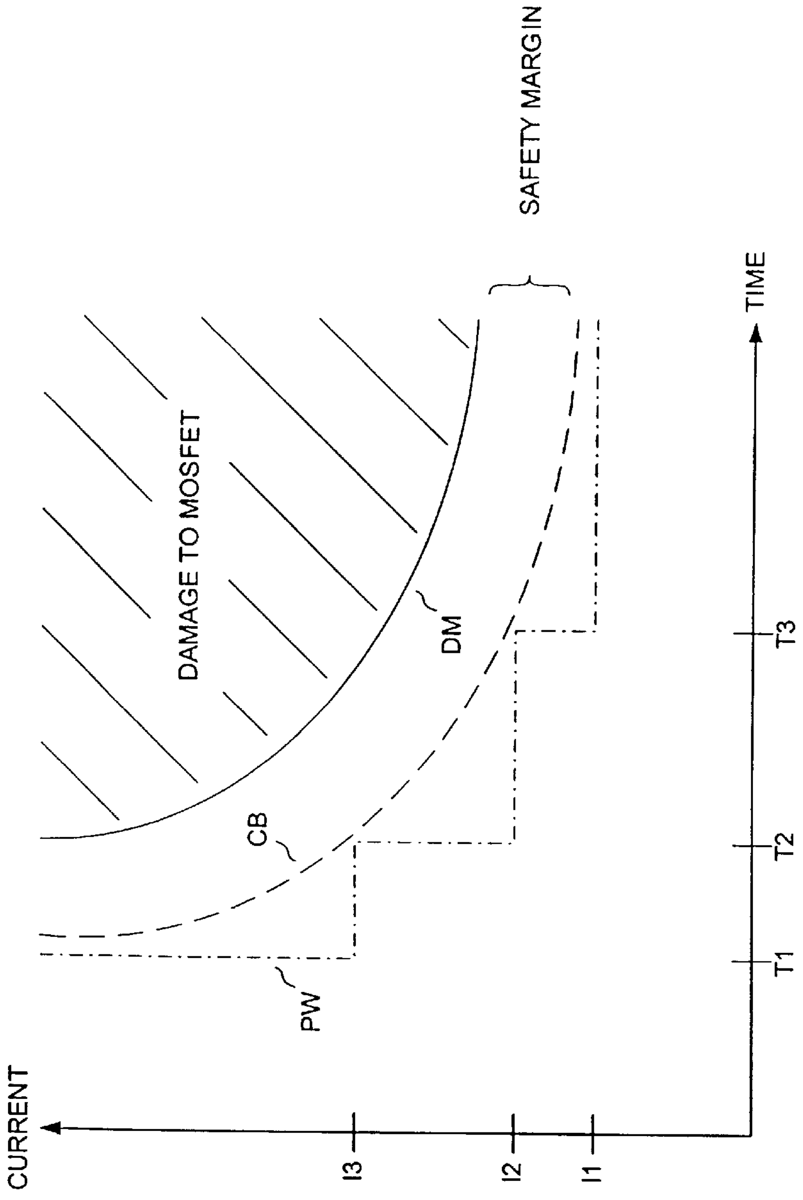
FIG. 6 is a graph of waveforms related to a piece-wise approximation of a thermal crowbar protection profile.

FIG. 6 is a graph illustrating a piece-wise approximation of the junction temperature estimation curves found in FIG. 3. The graph in FIG. 3 includes three transition curves (PW, CB, DM). The solid transition curve (DM) indicates the boundary where damage occurs in the MOSFET. As can be seen in the graph, a higher current results in a damaged MOSFET in a shorter time interval than a lower current. As the ambient temperature increases, the entire curve shifts down such that the required time interval is shortened for the same current. The dotted curve (CB) is included in the graph to illustrate an ideal transition boundary where the crowbar mode should be activated to prevent the MOS transistor (M22) from damage. The gap between the dotted curve (CB) and the solid curve (DM) indicates the safety margin that is desired to prevent damage to the MOSFET. The dash-dot curve (PW) indicates a piece-wise approximation of the ideal transition boundary where the crowbar mode is activated to prevent damage to the MOSFET. As noted on the dash-dot curve (PW), a low current level (I1<I<I2) requires a time interval of T3 to activate crowbar, a medium current level (I2<I<I3) requires a time interval of T2 to activate crowbar, and a high current level (I>I3) requires a time interval of T1 to the activate crowbar mode. The PW curve may include more intervals as may be desired for a more accurate representation of the CB curve.

Figure 7:
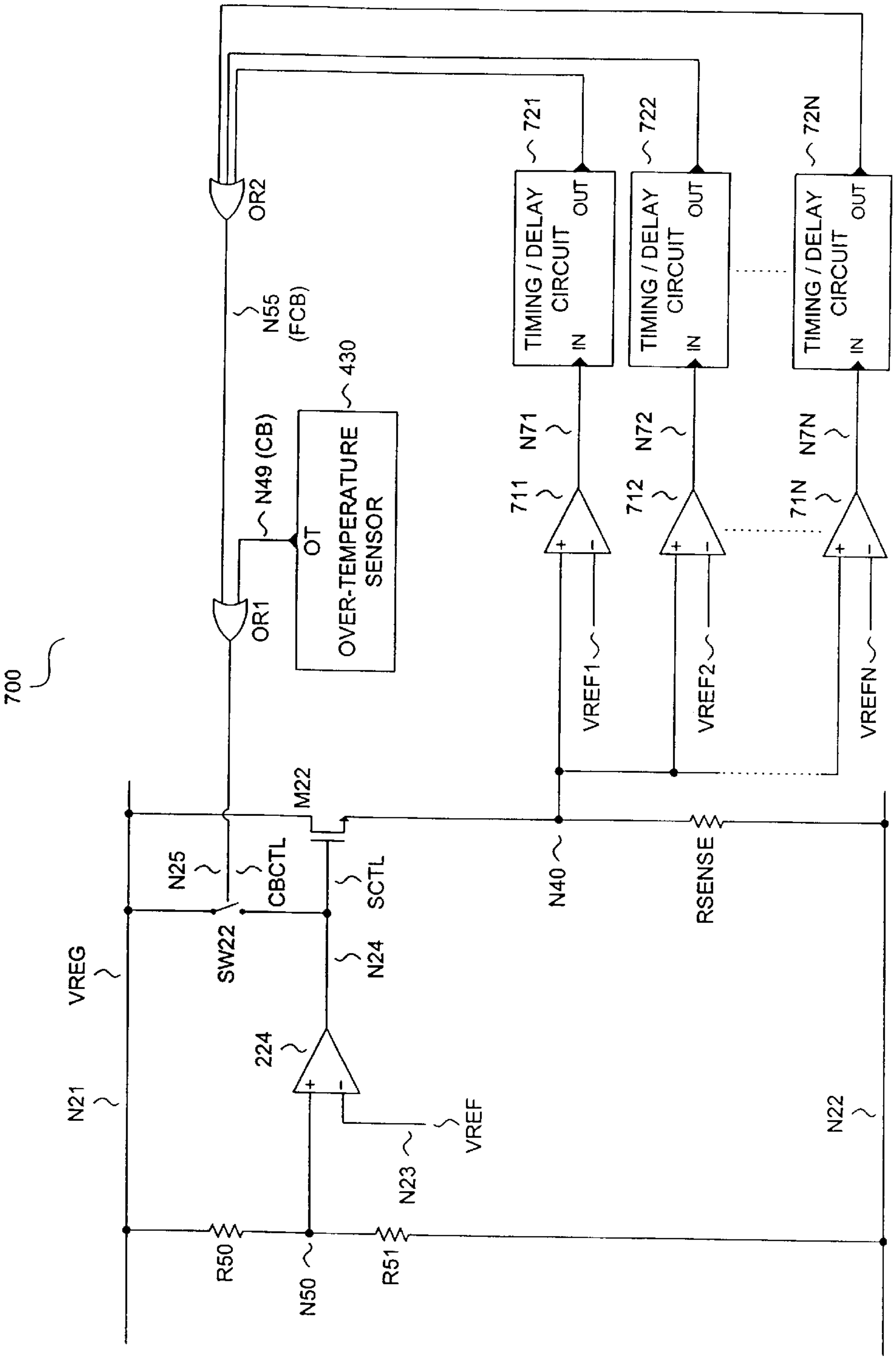
FIG. 7 is a schematic diagram of yet another exemplary embodiment.

The piece-wise approximation of the junction temperature estimation curve results in a quantized curve. The quantized levels, and delay times can be implemented using reduced complexity circuitry. An example circuit that uses the piece-wise approximation method is shown in FIG. 7 as a shunt regulator circuit (700) that includes an improved crowbar protection circuit. The regulator portion of FIG. 7 is substantially similar to the regulator circuit shown in FIG. 5. Like components from FIG. 5 are labeled identically. Refer to the previous discussion with respect to FIG. 5 for details. The improved crowbar protection circuit shown in FIG. 7 includes a series of (N) amplifier circuits (711, 712–71N), a series of (N) timing/delay circuits (721, 722–72N), and another OR logic gate (OR2).

Each of the amplifier circuits (711–71N) has a corresponding reference signal (VREF1–VREFN) coupled to its respective inverting input. The non-inverting input of each amplifier circuit (711–71N) is coupled to node N40. Each amplifier produces a respective output signal at a respective output node (N71–N7N) in response to the potential at node N40 and the corresponding reference signal (VREF1–VREFN). Each of the timing/delay circuits (720–72N) has an input coupled to a respective node (N71–N7N), and produces a corresponding delayed output signal.

Each of the timing/delay circuits (721–72N) has an associated delay time that is different from the other timing/delay circuits. Each of the associated delay times corresponds to the amount of time that a particular shunt current must persist before the crowbar mode must be activated. The corresponding reference signals (VREF1–VREFN) are different from one another. Each of the corresponding reference signals is associated with a particular amount of shunt current. As a potential develops across the sense resistor (RSENSE) at node N40, one or more of the amplifier circuits (711–71N) may produce a respective output signal indicating that the potential across the sense resistor has exceeded the associated signal level of the given reference signal. When the respective output signal has persisted for a sufficient amount of time, the fast crowbar mode will be activated. For example, the first amplifier circuit (711) produces an output signal at node N71, indicating that the potential at node N40 has exceeded the signal level of the first reference signal (VREF1). The first timing/delay circuit (721) produces an output signal indicating that crowbar mode must be activated after the output signal at node N71 has persisted for the associated delay time for the first timing/delay circuit (721). Thus, each set of amplifiers, timing/delay circuits and reference signal corresponds to a particular trip point in the piece-wise approximation shown in FIG. 6.

The delayed output signals are combined by the other OR logic gate (OR2), which produces the fast crowbar signal (FCB) at node N55. Although the improved crowbar protection circuit is described as including amplifier circuits, the amplifier circuits (711–71N) may be replaced by comparator circuits. Also, the sense resistor (RSENSE) and the amplifier circuits (711–71N) may be replaced by any other means of producing signals that correspond to particular quantized current levels in the MOS transistor (M22).

The timing/delay circuits (721–72N) may also include a common scaling factor that is arranged to scale their associated delay times. The scaling factor may correspond to a measured junction temperature that may be provided by the over-temperature sensor (430) or some other circuit (not shown). The scaling factor is arranged to reduce the associated delay times for each corresponding current level when the junction temperature of the MOS transistor (M22) is increased. For example, a persistence of 50 us (e.g., delay time is 50 uS) may be required before a 40A current level (e.g., VREF1 corresponds to a 40A current in RSENSE) in the MOS transistor (M22) is detected by the first timing/delay circuit (721), when the ambient junction temperature is 25° C. However, the crowbar mode may need to be activated in one-tenth of that delay time when the ambient junction temperature is 100° C. In this instance, the scaling factor is 0.1 when the ambient junction temperature is determined to be 100° C. Conversely, lower ambient junction temperatures may require a higher scaling factor (e.g., 10) since the delay time before triggering the crowbar mode may be longer.

Each of the timing/delay circuits (721–72N) also includes an associated memory. The associated memories are arranged such that the timing/delay circuits will not reset immediately after a signal is removed from the respective input. Instead, the timing/delay circuits are arranged to gradually reset such that the timing delay circuits simulate the heat dissipation in the junction of the MOS transistor (M22). An example timing/delay circuit is shown in FIG. 8.

Figure 8:
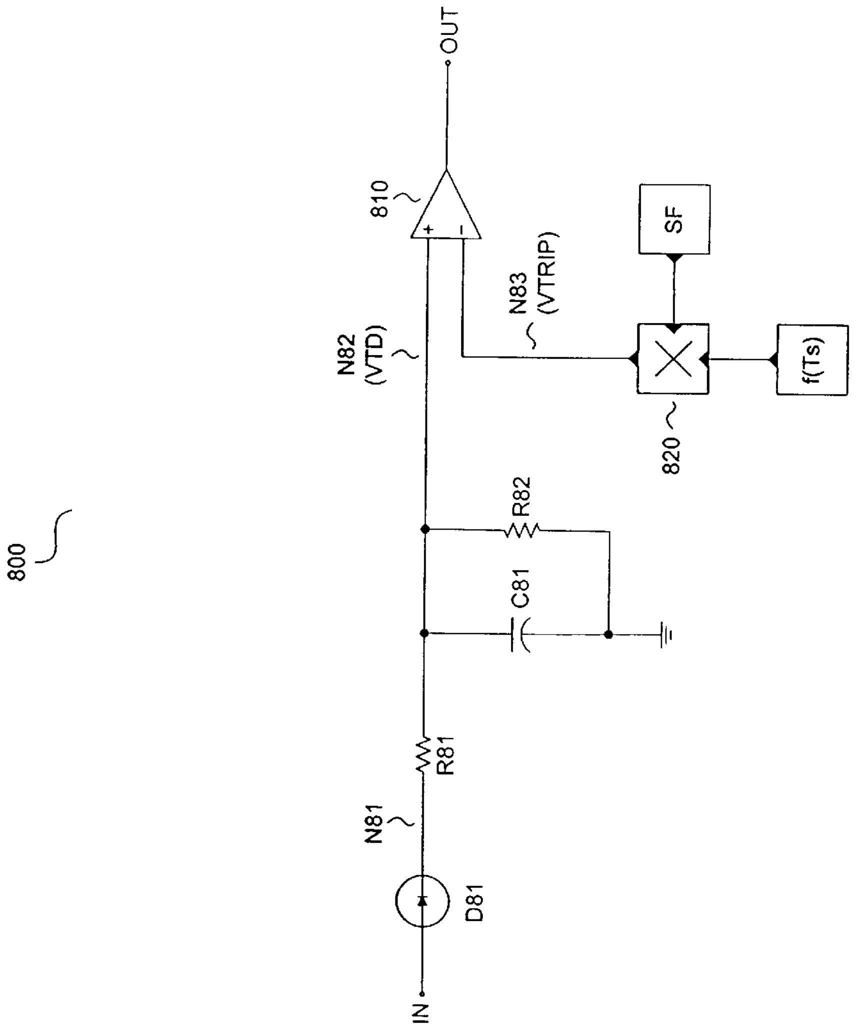
FIG. 8 is a schematic diagram of an exemplary timing/delay circuit.

As shown in FIG. 8, an example timing/delay circuit (800) includes a diode (D81), two resistors (R81, R82), a capacitor (C81), a comparator (810), and a multiplier (820). The diode (D81) is series connected between an input terminal (IN) and node N81. The first resistor (R81) is series connected between node N81 and node N82. The second resistor (R82) is connected between node N81 and a circuit ground potential (GND). The capacitor (C81) is connected between node N81 and the circuit ground potential (GND). The comparator (810) has a non-inverting input that is connected to node N82, an inverting input that is connected to node N83, and an output that is connected to an output terminal (OUT). The multiplier (820) is produces an output signal (VTRIP) that is connected to node N83.

In operation, an input signal is applied to the input terminal (IN) from the output of a logic circuit, a comparator circuit (e.g., 711 in FIG. 7), or some other circuit that is arranged to provide a voltage in response to detecting a particular current level in a MOS transistor (e.g., M22 in FIG. 7). The input signal (e.g., a voltage at node N71 in FIG. 7) forward biases the diode (D81) and starts a charging cycle for the capacitor (C81). The comparator (810) monitors the voltage at node N82 (VTD) and the voltage at node N83 (VTRIP). The voltage at node N82 (VTD) represents a time-delayed signal corresponding to the input signal, while the voltage at node N83 (VTRIP) represents a trigger or trip voltage for the comparator. The comparator produces at output signal (OUT) in response to a comparison between VTD and VTRIP. For example, the comparator may be configured to produce a high logic level (logic "1") when VTD exceeds VTRIP.

The capacitor (C81) and the first resistor (R81) have an associated time constant (i.e., a charging time constant) that determines the amount of time the input signal must be applied before the capacitor (C81) charges up to the trip voltage (VTRIP). However, if the input signal drops below the forward bias voltage of the diode (D81) then the capacitor will cease charging. In this event, the capacitor will begin to discharge through the second resistor R82. The capacitor (C81) and the second resistor (R2) have another associated time constant (i.e., a discharging time constant) that determines the amount of time required for the capacitor (C81) to discharge to ground through resistor R82. By varying the resistance and capacitance values of resistor R81, R82, and C81, the charging and discharging time constants can be adjusted. In one example, the resistor R82 has an associated value that is three times that of resistor R81 such that the discharging time is three times longer than the charging time.

The charging and discharging arrangement shown in FIG. 8 operates as an analog delay element with a controlled decay rate such that the circuit has memory of previous events. For example, at time t1 a high potential is applied to the input terminal and a charging cycle begins. At time t2, a low potential is applied to the input terminal and the discharging cycle begins. At time t3, a high potential is again applied to the input terminal and another charging cycle begins. However, since the capacitor has not completely discharged at time t3, the amount of charging time necessary before the comparator will trip is shortened.

The voltage at node N83 (VTRIP) may be adjusted by a temperature dependent function (e.g., f(T)). A scaling factor (e.g., SF) and the temperature dependent function (e.g., f(T)) are multiplied together by multiplier 820 to produce VTRIP. This arrangement is used to adjust the charging time delay as temperature varies. For example, as temperature increases the amount of time required before triggering the crowbar mode (see FIGS. 3 and 6) will shorten. By decreasing the trip voltage as the temperature increases, the time delay between an applied signal at the input terminal (IN) and the output signal changing will be shortened, activating the crowbar mode faster. Different time constants and scaling factors may be used for each of the timing/delay circuits shown in FIG. 7.

Figure 9:
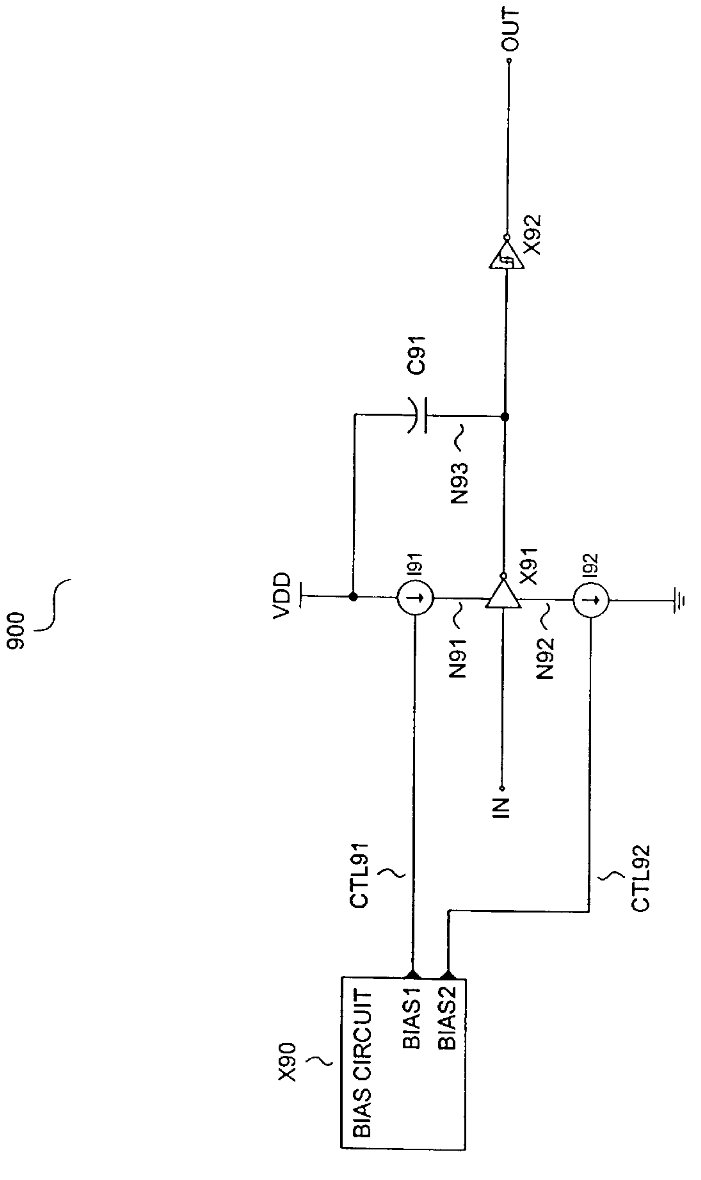
FIG. 9 is a schematic diagram of another exemplary timing/delay circuit.

Another example timing/delay circuit is shown in FIG. 9. As shown in the figure, the timing/delay circuit (900) includes a bias circuit (X90), two controlled current sources (I91, I92), an inverter (X91), a Schmitt-trigger (X92), and a capacitor (C91). The inverter (X91) has an input that is coupled to an input terminal (IN), an output that is coupled to node N93, a high power terminal that is coupled to node N91, and a low power terminal that is coupled to node N92. The first controlled current source (I91) sources current to the high power terminal, while the second controlled current source sinks current out of the low power terminal. The capacitor (C91) is coupled between node N93 and a power supply voltage (VDD). The Schmitt trigger (X92) has an input that is coupled to node N93 and an output that is coupled to an output terminal (OUT). The bias circuit (X90) has a first output (BIAS) that is arranged to provide a first control signal (CTL91) to the first controlled current source (I91), and a second output (BIAS2) that is arranged to provide a second control signal (CTL92) to the second controlled current source (I92).

In operation, an input signal is applied to the input terminal (IN) from the output of a logic circuit, a comparator circuit (e.g., 711 in FIG. 7), or some other circuit that is arranged to provide a voltage in response to detecting a particular current level in a MOS transistor (e.g., M22 in FIG. 7). The inverter (X91) produces an output signal at node N93 in response to the input signal (e.g., a voltage at node N71 in FIG. 7). However, the inverter (X91) is arranged to selectively source or sink a fixed current as determined by controlled current sources I91 and I92. Since the output of the inverter at node N93 is loaded down by the capacitor (C91), the voltage at node N93 cannot change instantaneously. Instead, the capacitor (C91) will charge or discharge at a fixed rate determined by the controlled current sources (I91, I92). The Schmitt trigger provides a signal to the output terminal in response to the voltage at node N93. The Schmitt trigger (X92) operates as a voltage detector circuit that detects when the voltage at node N93 exceeds a predetermined threshold voltage.

The charging and discharging arrangement shown in FIG. 9 operates as an analog delay element with memory of previous events. For example, at time t1 a high potential is applied to the input terminal and a charging cycle begins, where a charging current (e.g., I91) charges the capacitor (C91) at a first controlled rate. At time t2, a low potential is applied to the input terminal and a discharging cycle begins, where a discharge current (e.g., I92) discharges the capacitor (C91) at a second controlled rate. At time t3, a high potential is again applied to the input terminal and another charging cycle begins. However, since the capacitor has not completely discharged at time t3, the amount of charging time necessary before the Schmitt trigger (or voltage detector) will trip is shortened. The charging rate for a capacitor (C) which is driven by a fixed current (I) is given by (d/dt)V=I/C. Thus, by controlling the current levels of I91 and I92, the charging and discharging times can be adjusted to provide a desired time delay.

The bias circuit (X90) provides control signals (CTL91, CTL92) to the controlled current sources (I91, I92). The bias circuit (X90) can be arranged to provide currents that are proportional to temperature such that the current levels increase as the temperature increases. An increase in temperature translates into a decreased charging and discharging time (i.e., dV/dt increases as I increases). The bias circuit (X90) may also be arranged to provide control signals that enable the controlled current sources to provide current levels that are scaled with respect to one another (i.e. I91=−3·I92). By scaling the currents with respect to one another, the charging and discharging periods for the capacitor (C91) can be adjusted.

Other voltage detector circuits may be used in place of the Schmitt trigger (X92), including but not limited to, an inverter circuit, a comparator circuit, an operational amplifier, as well as others. Additionally, the capacitor (C91) and current sources (I91, I92) may be replaced with another circuit that provides a scalable time delay. For example, another capacitance circuit that includes multiple capacitive elements that are selectively switched into or out of the circuit may be employed to provide time delay scaling in place of capacitor C91. In light of the above disclosure, other scalable time delay circuit arrangements may be employed that provide a similar function to the circuits shown in FIGS. 8 and 9.

Figure 10:
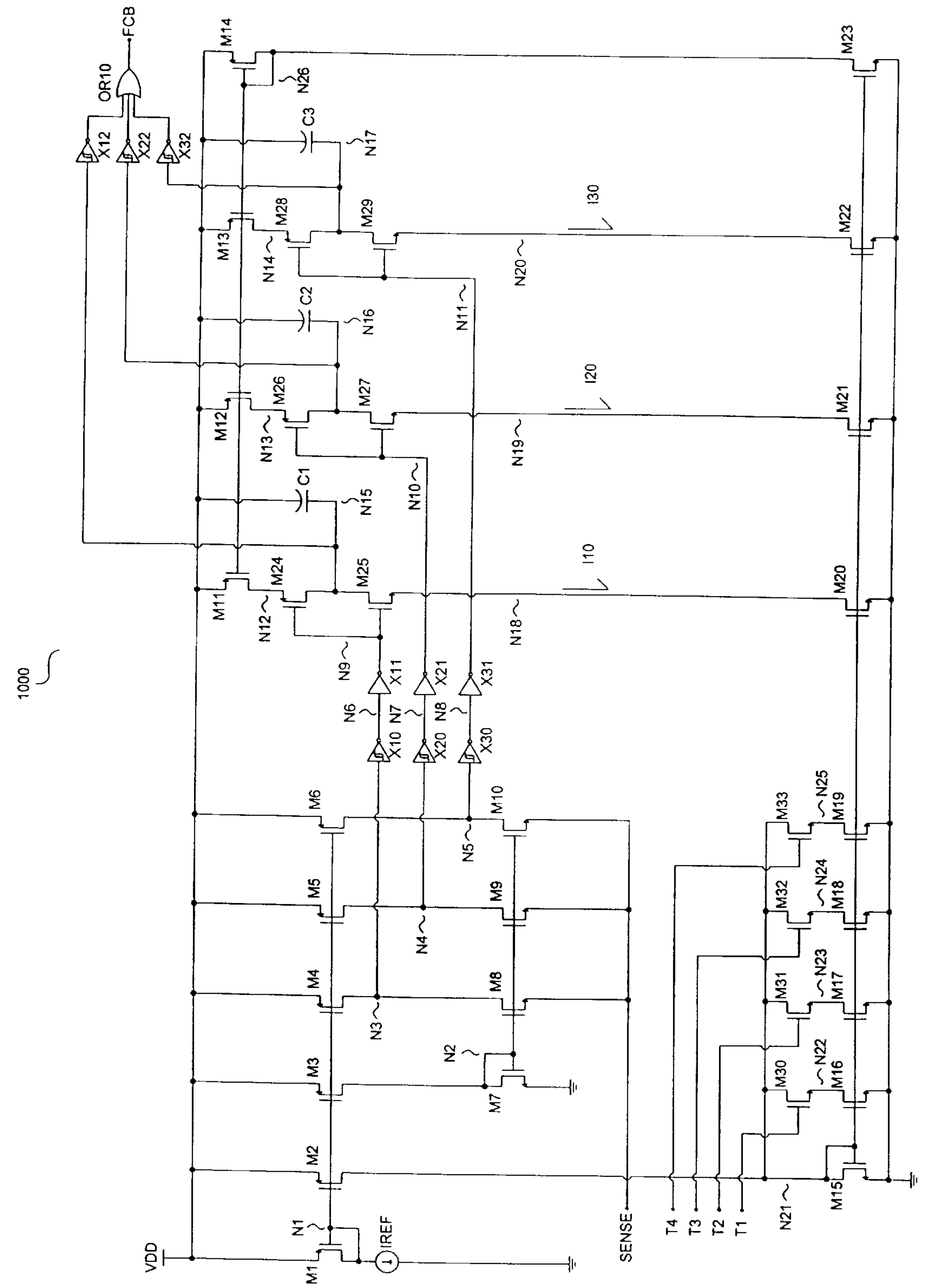
FIG. 10 is a schematic diagram of an exemplary fast-crowbar circuit, in accordance with the present invention.

A portion of an improved crowbar protection circuit (1000) that is in accordance with the present invention is shown in FIG. 10. The circuit (1000) provides a comparator circuit and a timing/delay circuit as will be discussed below. The circuit (100) includes thirty-three MOS transistors (M1–M33), three capacitors (C1–C3), three inverters (X11, X21, X31), six Schmitt triggers (X10, X12, X20, X22, X30, X32), a current reference (IREF), and an OR logic gate (OR10).

Transistors M1–M6 have common sources that are coupled to a power supply potential (VDD), and common gates that are coupled to node N1. Transistor M1 has a drain that is coupled to node N1. Transistor M2 has a drain that is coupled to node N21. Transistor M3 has a drain that is coupled to node N2. Transistor M4 has a drain that is coupled to node N3. Transistor M5 has a drain that is coupled to node N4. Transistor M6 has a drain that is coupled to node N5. Transistors M8–M10 have common gates that are coupled to node N40, and common sources that are coupled to a sense terminal (SENSE). Transistor M7 has a source coupled to a circuit ground potential (GND), and a gate and drain that are coupled to node N2. Transistor M8 has a drain that is coupled to node N3. Transistor M9 has a drain that is coupled to node N4. Transistor M10 has a drain that is coupled to node N5. Schmitt trigger X10, X20 and X30 have inputs that are coupled to nodes N3, N4, and N5 respectively, and outputs that are coupled to nodes N6, N7, and N8 respectively. Inverters X11, X21, and X31 have inputs that are coupled to nodes N6, N7, and N8 respectively, and outputs that are coupled to nodes N9, N10, and N11 respectively. As shown in the figure, transistors M1–M6 are NMOS type transistors, while transistors M7–M10 are PMOS type transistors.

In operation, a current reference (IREF) is coupled to node N1. The current reference (IREF) is provided by another circuit (not shown) such as, for example, a band-gap reference circuit, or some other circuit that is arranged to provide a stable operating current. Transistors M2–M6 have the same gate-source voltage (VGS) as transistor M1 such that transistor M1 provides a biasing potential at node N1 for transistors M2–M6. Transistors M2–M6 will conduct currents that are scaled with respect to the reference current (IREF) when active. Transistor M7 is arranged to operate as a diode device that is provides another biasing potential to transistors M8–M10 at node N2 in response to the current flowing from the drain of transistor M3 (and thus also related to IREF). However, the source potentials of transistors M8–M10 are not connected to ground, and are instead coupled to the sense node (SENSE). When transistors M8–M10 are active, the potentials at nodes N3–N5 will be pulled down to a low potential that is effective to cause the Schmitt triggers (X10, X20, X30), and the inverters (X11, X21, X31) to provide a low logic level (logic "0") output to nodes N9–N11 respectively. Transistors M8–M10 are active when the potential at the sense node (SENSE) is at the same potential as the circuit ground potential (GND). However, as the potential at the sense input (SENSE) increases above the circuit ground potential (GND) one or more of transistors M8–M10 will be deactivated. When one or more of the transistors (M8–M10) are deactivated, the potentials at the corresponding nodes N3–N5 will be pulled up to the power supply potential (VDD), causing the corresponding potential at nodes N9–N11 to produce a high logic level (logic "1").

Transistors M7–M10 are not sized identically. The size of each MOS transistor corresponds to a ratio of the effective channel width to the effective channel length. In bipolar technology, the size of each transistor corresponds to the area of the emitter. In one exemplary embodiment, the size of transistors M7–M10 increases as their order increases (i.e. M7 is smaller than M8). In this example, transistor M8 will require a greater VGS than transistor M7 to be biased as an active device, transistor M9 will require a greater VGS than transistor M8 to be biased as an active device, and transistor M10 will require a greater VGS than transistor M9 to be biased as an active device. By scaling the sizes of the transistors, each transistor is arranged as a voltage detector detecting a different voltage at the sense input (SENSE). In one example, M8–M10 are arranged to detect voltages that are above the circuit ground potential by 29 mV, 44 mV, and 67 mV respectively. Since the transistors (M8–M10) have a substantially constant gate voltage, an increase in the potential at the sense input (SENSE) decreases each corresponding VGS such that one or more of the transistors (M8–M10) will be unable to conduct the current provided by transistors M4–M6 respectively, causing the potentials at nodes N3–N5 to rise to the power supply potential (VDD). Thus, transistors M3–M10, Schmitt triggers X10, X20, and X30, and inverters X11, X21, and X31 collectively operate as voltage comparators that provide a signal at nodes N9–N11 in response to the potential at the sense input (SENSE).

Transistors M15–M19 have common sources that are coupled to a circuit ground potential (GND), and common gates that are coupled to node N21. Transistor M15 has a drain that is coupled to node N21. Transistor M16 has a drain that is coupled to node N22. Transistor M17 has a drain that is coupled to node N23. Transistor M18 has a drain that is coupled to node N24. Transistor M19 has a drain that is coupled to node N25. Transistors M30–M33 have gates that are coupled to input terminals T1–T4 respectively, and common drains coupled to node N21. Transistor M30 has a source coupled to a node N22. Transistor M31 has a source coupled to a node N23. Transistor M32 has a source coupled to a node N24. Transistor M33 has a source coupled to a node N25. As shown in the figure, transistors M15–M19 are NMOS type transistors, while transistors M30–M33 are PMOS type transistors.

Transistors M15–M19 and M30–M33 are arranged to selectively provide a biasing potential at node N21 in response to the current flowing from transistor M2 and control signals T1–T4. Transistors M30–M33 are arranged to operate as couplers that selectively couple nodes N22–N25 to node N21 in response to the control signals provided by input terminals T1–T4 respectively. For example, when the potential at input terminal T1 activates transistor M30, transistor M16 operates as a diode that is arranged in parallel with transistor M15. By selectively coupling transistors M16–M19 in parallel with transistor M15, the biasing potential at node N21 can be modified. In one example, the control signals that are provided at input terminals T1–T4 correspond for different operating temperatures that are detected by a thermal sensor circuit (not shown) such that the biasing potential is higher at higher temperatures.

Transistors M11–M14 have common sources coupled to the power supply potential (VDD), and common gates coupled to node N26. Transistor M11 has a drain coupled to node N12. Transistor M12 has a drain coupled to node N13. Transistor M13 has a drain coupled to node N14. Transistor M14 has a drain coupled to node N26. Transistors M20–M23 have common sources coupled to the circuit ground potential (GND), common gates coupled to node N21, and drains that are coupled to node N18, N19, N20, and N26 respectively. Transistor M24 has a source coupled to node N12, a gate coupled to node N9, and a drain coupled to node N15. Transistor M25 has a source coupled to node N18, a gate coupled to node N9, and a drain coupled to node N15. Transistor M26 has a source coupled to node N13, a gate coupled to node N10, and a drain coupled to node N16. Transistor M27 has a source coupled to node N19, a gate coupled to node N10, and a drain coupled to node N16. Transistor M28 has a source coupled to node N14, a gate coupled to node N11, and a drain coupled to node N17. Transistor M29 has a source coupled to node N20, a gate coupled to node N11, and a drain coupled to node N17. Capacitors C1 is coupled between node N15 and the power supply potential (VDD). Capacitor C2 is coupled between node N16 and the power supply potential (VDD). Capacitor C3 is coupled between node N17 and the power supply potential (VDD). Schmitt triggers X12, X22, and X32 have inputs coupled to nodes N15–N17 respectively, and outputs that are combined by the OR logic gate (OR10). The output of the OR logic gate (OR10) is coupled to an output terminal (FCB). As shown in the figure, transistors M20–M23, M25, M27, and M29 are NMOS type transistors, while transistors M11–M14, M24, M26, and M28 are PMOS type transistors.

Transistor M14 is arranged as a diode that provides a biasing potential at node N26. Transistor M11–M14 have common source and gate connections such that transistors M11–M13 have drain currents that are controlled by the potential at node N26 when active. Similarly, transistors M20–M23 have common source and gate connections such that transistors M20–M23 have drain currents that are controlled by the potential at node N21 when active. As discussed previously, the potential at node N21 is controlled by control signals that are provided at input terminals T1–T4 respectively. The control signals that are provided at input terminals T1–T4 will increase or decrease the operating currents for transistors M20–M23 and M11–M14 respectively.

In operation, transistors M11–M14, M20–M29, capacitors C1–C3, and Schmitt triggers X12, X22, and X32 are arranged to function as three controlled timing/delay circuits that operate similarly to the timing/delay circuit (900) discussed with respect to FIG. 9. For example, transistors M11, M20, M24, M25, capacitor C1, and Schmitt trigger X12 are arranged as an exemplary timing/delay circuit. Transistor M11 operates as a current source (e.g., I91 in FIG. 9) that provides a current based on a biasing potential (e.g., CTL91 in FIG. 9) that is provided at node N26. Transistor M20 operates as a current source (e.g., I91 in FIG. 9) that sinks a current based on another biasing potential (e.g., CTL92 in FIG. 9) that is provided at node N21. Transistors M24 and M25 are arranged to operate as an inverter with an input at node N9 and an output at node N15. Transistors M12, M21, M26, M27, capacitor C2, and Schmitt trigger X22 are arranged as another exemplary timing/delay circuit, while transistors M13, M22, M28, M29, capacitor C3, and Schmitt trigger X32 are arranged as yet another exemplary timing/delay circuit. Capacitors C1, C2, and C3 are sized to provide a particular charging and discharging time. The operation of the exemplary timing circuits is the same as that discussed with respect to FIG. 9 (see above).

Each of the timing/delay circuits discussed above corresponds to a different time delay as shown in FIG. 6. Each of the comparator circuit arrangements discussed above have a corresponding timing/delay circuit such that the operation illustrated in FIG. 6 is realized. Although the circuits discussed herein illustrate three distinct timing/delay circuits and associated comparator circuits, any other number of circuits may be employed as may be desired for a more accurate representation of the graph illustrated in FIG. 3.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for estimating a temperature in a shunt circuit that includes a transistor having an associated shunt current, an associated ambient temperature, and an associated heat dissipation factor, the apparatus comprising:

- a measurement circuit that is arranged to produce a measurement signal that is associated with the shunt current;
- an integration circuit that is arranged to produce an integration signal in response to the measurement signal such that the integration signal corresponds to an integral of the measurement signal over a time interval, wherein the integration signal corresponds to the rise in temperature in the shunt circuit such that the temperature of the shunt circuit is estimated using the integration signal.

2. An apparatus as in claim 1, the integration circuit further comprising a dissipation circuit that is arranged to produce a dissipation signal that is related to the heat dissipation factor, wherein the integration signal corresponds to a temperature rise that is reduced by an amount associated with the dissipation signal.

3. An apparatus as in claim 1, the integration circuit further comprising an operational amplifier circuit that is arranged to produce the integration signal in response to the measurement signal, wherein the measurement signal is related to the shunt current such that the integration signal corresponds to an integral of the shunt current over the time interval.

4. An apparatus as in claim 1, the measurement circuit further comprising:

- a resistance circuit that is arranged in series with the shunt circuit such that the resistance circuit produces a voltage drop in response to the shunt current; and
- an amplifier circuit that is arranged to produce the measurement signal in response to the voltage drop such that the measurement signal is related to the shunt current.

5. An apparatus as in claim 1, wherein the integration circuit includes the measurement circuit, the integration circuit further comprising:

- a resistance circuit that is arranged in series with the shunt circuit such that the resistance circuit produces a voltage drop in response to the shunt current; and
- an amplifier circuit that is arranged to produce the integration signal in response to the voltage drop such that the integration signal is related to the shunt current.

6. An apparatus as in claim 1, further comprising a comparison circuit that is arranged to produce an indication signal in response to a comparison between the integration signal and a reference signal such that the indication signal indicates when the integration signal has exceeded the reference signal.

7. An apparatus as in claim 6, wherein the reference signal is arranged to change in response to a change in the ambient temperature.

8. An apparatus as in claim 7, wherein the reference signal indicates a margin of thermal protection for the shunt device and the indication signal indicates that the temperature of the shunt device has exceeded the margin of thermal protection.

9. An apparatus as in claim 1, further comprising a temperature measurement circuit that is arranged to produce a temperature measurement signal that corresponds to the ambient temperature, and the temperature of the shunt circuit is estimated using the integration signal and the temperature measurement signal.

10. An apparatus for producing a detection signal that indicates that an estimated temperature has exceeded a safety temperature in a circuit that includes a transistor circuit with an associated operating current, the apparatus, comprising:

- a means for measuring current that is arranged to measure the operating current of the transistor circuit and produce a measured operating current;
- a means for integrating that is arranged to integrate the measured operating current over a time interval to produce an integration signal;
- a means for estimating that is arranged to provide the estimated temperature in response to the integration signal, where the integration signal corresponds to a rise in the ambient temperature of the transistor circuit; and
- a means for comparing that is arranged to compare the estimated temperature to the safety temperature and produce a fast detection signal, wherein the fast detection signal indicates that the estimated temperature has exceeded the safety temperature and the detection signal is responsive to the fast detection signal.

11. An apparatus as in claim 10, further comprising a means for detecting an over-temperature condition that is arranged to produce an over-temperature signal to indicate that the ambient temperature has exceeded a temperature threshold, and means for combining that is arranged to produce the detection signal in response to the over-temperature signal and the fast detection signal.

12. An apparatus as in claim 11, wherein the temperature threshold is related to the breakdown junction temperature of the transistor circuit, and the safety temperature is also related to the breakdown junction temperature of the transistor circuit.

13. An apparatus as in claim 10, further comprising a means for dynamically adjusting the safety temperature in response to the ambient temperature such that the time interval that is required before the estimated temperature has exceeded the safety margin is reduced as the ambient temperature increases, and the time interval is increased as the ambient temperature decreases.

14. An apparatus as in claim 13, wherein the means for dynamically adjusting the safety temperature is at least one of a continuous adjustment and a piece-wise linear approximation of the continuous adjustment.

15. An apparatus as in claim 10, further comprising a means for measuring temperature that is arranged to measure the ambient temperature at an initial time and produce a measured ambient temperature that is associated with the transistor circuit, wherein the means for estimating determines the estimated temperature in response to the integration signal and the measured ambient temperature.

16. An apparatus for estimating a temperature in a shunt circuit that includes a transistor having an associated shunt current, an associated ambient temperature, and an associated heat dissipation factor, the apparatus comprising:

a measurement circuit that is arranged to produce a measurement signal that is associated with the shunt current;

a bank of N comparator circuits, each of the bank of N comparator circuits producing a corresponding detection signal in response to a comparison between the measurement signal and a corresponding reference signal, wherein detection signal indicates that the shunt current has exceeded a corresponding current threshold level that is determined by the corresponding reference signal;

a bank of N timing/delay circuits, each of the bank of N timing/delay circuits produces a corresponding timeout signal when a corresponding one of the detection signals has persisted for a corresponding delay time interval; and a combination circuit that combines the N timeout signals to produce a fast detection signal such that the fast detection signal indicates that the shunt current has exceeded at least one of the current threshold levels for the corresponding delay time interval.

17. An apparatus as in claim 16, each of the bank of N timing/delay circuits further comprising:

a capacitive circuit that is arranged to charge at a first rate when the corresponding detection signal is a first logic level, and the capacitive circuit is arranged to discharge at a second rate when the corresponding detection signal is a second logic level that is different from the first logic level; and a comparator circuit that is arranged to produce a timeout signal by comparing a trip voltage to a charged voltage that is associated with charge stored in the capacitive circuit such that the timeout signal is a first logic level when the charged voltage is substantially less than the trip voltage and the timeout signal is a second logic level that is different from the first logic level when the charged voltage is substantially greater than the trip voltage, whereby the charge stored on the capacitive circuit provides a thermal memory corresponding to a previous shunt current level of a previous time interval.

18. An apparatus as in claim 17, further comprising a trip point adjustment circuit that is arranged to adjust the trip voltage in response to the ambient temperature such that a time delay between a change in the detection signal and a corresponding change in the timeout signal is increased as the temperature decreases, and the time delay is decreased as the temperature increases.

19. An apparatus as in claim 16, each of the bank of N timing/delay circuits further comprising:

a capacitive circuit that is arranged to charge at a first rate when the corresponding detection signal is a first logic level, and the capacitive circuit is arranged to discharge at a second rate when the corresponding detection signal is a second logic level that is different from the first logic level; and a voltage detector circuit that is arranged to produce the timeout signal in response to a charged voltage that is associated with charge stored in the capacitive circuit such that the timeout signal is a first logic level when the charged voltage is substantially less than a first trip voltage and the timeout signal is a second logic level that is different from the first logic level when the charged voltage is substantially greater than a second trip voltage, whereby the charge stored on the capacitive circuit provides a thermal memory corresponding to a previous shunt current level of a previous time interval.

20. An apparatus as in claim 19, wherein the voltage detector circuit includes at least one of an inverter circuit, a Schmidt trigger circuit, a comparator circuit, an amplifier circuit, and a logic circuit.

21. An apparatus as in claim 19, wherein each capacitive circuit of each bank of N timing/delay circuits further comprising:

a first controlled current source that is arranged to selectively provide a first current corresponding to the first rate in response to the detection signal at the first logic level; and a second controlled current source that is arranged to selectively provide a second current corresponding to the second rate in response to the detection signal at the second logic level such that the capacitive circuit is charged and discharged in response to the first and second controlled currents respectively.

22. An apparatus as in claim 21, further comprising a bias circuit that is arranged to a produce a first and second bias signal for the first and second controlled current sources of each of the bank of N timing/delay circuits, wherein the first and second bias signals are adjusted in response to the ambient temperature such that the first currents are increased in response to increased ambient temperatures and the second currents are increased in response to decreased ambient temperatures.

23. An apparatus as in claim 16, wherein each of the bank of N comparator circuits includes a detection transistor that is coupled to the measurement signal and arranged to provide the detection signal in response to the measurement signal, wherein the reference signal corresponds to a biasing condition of the detection transistor with a specific measurement signal associated with a specific shunt current level such that changes in the shunt current are detected when the measurement signal activates and deactivates the transistor by changing the biasing condition on the transistor.

24. A method that estimates a temperature in a shunt device that has an ambient temperature and an operating current level, comprising:

sensing the operating current level of the shunt device to produce a sense signal;

integrating the sense signal over a time interval from the initial time to a subsequent time to produce an estimated temperature rise signal; and estimating the temperature of the shunt device in response to the estimated temperature rise signal.

25. The method of claim 24, further comprising comparing the estimated temperature rise signal to a reference signal that is related to the ambient temperature to produce a fast detection signal that indicates the estimated temperature rise signal has exceeded a safety margin for the shunt device.

26. The method of claim 25, wherein the reference signal changes as the ambient temperature changes such that the safety margin is maintained as the ambient temperature changes.

27. The method of claim 24, further comprising approximating the integration of the sense signal using a piece-wise linear approximation.

28. The method of claim 27, further comprising:

comparing the sense signal and a first reference signal to produce a first detection signal that corresponds to a first operating current level of the shunt device;

comparing the sense signal and a second reference signal to produce a second detection signal that corresponds to a second operating current level that is different from the first operating current level;

charging a first capacitive circuit at a first charge rate in response to the first detection signal when the sense signal indicates that the operating current level is substantially greater than the first operating current level, the first capacitive circuit having a first potential;

charging a second capacitive circuit at a second charge rate in response to the second detection signal when the sense signal indicates that the operating current level has exceeded the second operating current level, the second capacitive circuit having a second potential;

discharging the first capacitive circuit at a first discharge rate in response to the first detection signal when the sense signal indicates that the operating current level is substantially less than the first operating current level;

discharging the second capacitive circuit at a second discharge rate in response to the second detection signal when the sense signal indicates that the operating current level is substantially less than the second operating current level;

detecting that the first potential has exceeded a first reference signal to produce a first detection signal;

detecting that the second potential has exceeded a second reference signal to produce a second detection signal; and determining that the estimated temperature rise signal has exceeded a safety margin in response to at least one of the first detection signal and the second detection signal.

29. A method as in claim 28, further comprising changing the first and second reference signals in response to a change in the ambient temperature.

30. A method as in claim 28, further comprising changing the first and second charge and discharge rates in response to a change in the ambient temperature.

31. A method as in claim 28, further comprising activating a fast crowbar mode in the shunt circuit in response to at least one of the first detection signal and the second detection signal.

32. A method as in claim 31, further comprising:

sensing that an over-temperature condition has occurred in the shunt circuit to produce an over-temperature signal; and activating a crowbar mode in the shunt circuit in response to the over-temperature signal.

* * * * *

UNITED STATES PATENT AND TRADEMARK OFFICE

CERTIFICATE OF CORRECTION

PATENT NO. : 6,631,066 B1
DATED : November 12, 2004
INVENTOR(S) : Gregory J. Smith et al.

It is certified that error appears in the above-identified patent and that said Letters Patent is hereby corrected as shown below:

Title page,
Beginning "[73], Assignee: National Semiconductor Corporation, Santa Clara, CA (US)"
Should read -- [73], Assignee: National Semiconductor Corporation, Santa Clara, CA (US); and Motorola, Inc. Schaumburg, IL (US) --

Column 8,
Line 64, "MOS transistor (422)" should read -- MOS transistor (M22) --

Signed and Sealed this

Fourth Day of January, 2005

JON W. DUDAS
*Director of the United States Patent and Trademark Office*

UNITED STATES PATENT AND TRADEMARK OFFICE

CERTIFICATE OF CORRECTION

PATENT NO. : 6,631,066 B1
DATED : October 7, 2003
INVENTOR(S) : Gregory J. Smith et al.

It is certified that error appears in the above-identified patent and that said Letters Patent is hereby corrected as shown below:

Title page,
Beginning "[73], Assignee: National Semiconductor Corporation, Santa Clara, CA (US)"
Should read -- [73], Assignee: National Semiconductor Corporation, Santa Clara, CA (US); and Motorola, Inc. Schaumburg, IL (US) --.

Column 8,
Line 64, "MOS transistor (422)" should read -- MOS transistor (M22) --.

This certificate supersedes Certificate of Correction issued January 4, 2005.

Signed and Sealed this

Thirty-first Day of January, 2006

JON W. DUDAS
*Director of the United States Patent and Trademark Office*